US007159038B2

(12) United States Patent
Rychlicki

(10) Patent No.: US 7,159,038 B2
(45) Date of Patent: Jan. 2, 2007

(54) METHOD OF ADDRESSING NETWORKED DEVICES

(75) Inventor: Victor John Rychlicki, 1206 Dressage Ridge, Conyers, GA (US) 30013

(73) Assignee: Victor John Rychlicki, Conyers, GA (US)

( * ) Notice: Subject to any disclaimer, the term of this patent is extended or adjusted under 35 U.S.C. 154(b) by 782 days.

(21) Appl. No.: 10/193,832

(22) Filed: Jul. 13, 2002

(65) Prior Publication Data

US 2003/0023753 A1 Jan. 30, 2003

Related U.S. Application Data

(60) Provisional application No. 60/307,713, filed on Jul. 26, 2001.

(51) Int. Cl.
*G06F 15/16* (2006.01)

(52) U.S. Cl. .................. 709/245; 709/200; 709/238

(58) Field of Classification Search ............... 709/245, 709/238, 200
See application file for complete search history.

(56) References Cited

U.S. PATENT DOCUMENTS

| 4,727,475 A | | 2/1988 | Kiremidjian | |
|---|---|---|---|---|
| 5,325,433 A | * | 6/1994 | Torii et al. | 380/30 |
| 5,465,251 A | | 11/1995 | Judd | |
| 5,757,796 A | | 5/1998 | Hebb | |
| 5,872,524 A | | 2/1999 | Iida | |
| 6,114,970 A | | 9/2000 | Kirson | |
| 6,392,558 B1 | | 5/2002 | Schulmeyer | |

FOREIGN PATENT DOCUMENTS

| JP | 401300741 A | * | 5/1988 |
|---|---|---|---|
| JP | 402305245 A | * | 5/1989 |

OTHER PUBLICATIONS

Network Working Group, RFC 1924, by R. Elz, University of Melbourne, publ. Apr. 1, 1996.*

* cited by examiner

*Primary Examiner*—Patrice Winder
*Assistant Examiner*—V. Korobov

(57) ABSTRACT

This method provides addressing for interconnected devices in a communications infrastructure. This is accomplished by first assigning the infrastructure and its parts or portions an identifier represented by a prime number; secondly, creating a calculated or coded address for each device in the infrastructure by creating portions of a completed device address individually then arranging the portions in a predetermined order. Creating each portion of an address is accomplished by one of three processes. First, noting the assigned number identifying the device or portion of the infrastructure; or second, producing the product of at least two numbers representing the same portion of the infrastructure; or third, calculating or coding a portion of an address by utilizing a data-table (FIG. 2) to inter-relate device information and additional information followed by a calculation to produce a number representing the given device address portion. A process for extracting encoded information is also described.

10 Claims, 4 Drawing Sheets

FIG. 7

| | 3/3/2 | 5/2/3 | 5/2/5 | P |
|---|---|---|---|---|
| 2 | 2 | 3* | 5* | 7* |
| 3 | 11 | 13 | 17 | 19* |
| 5 | 23 | 29 | 31 | 34* |
| 7 | 41 | 43* | 47 | 53 |
| 11 | 59* | 61 | 67 | 71* |
| 13 | 73 | 79 | 83 | 89* |

FIG. 6

METHOD OF ADDRESSING NETWORKED DEVICES

CROSS REFERANCE TO RELATED APPLICATIONS

This application is based on provisional application Ser. No. 60/307,713, filed on Jul. 26, 2001.

FEDERALLY SPONSORED RESEARCH

Not Applicable

SEQUENCE LISTING OR PROGRAM

Not Applicable

BACKGROUND OF THE INVENTION

This invention relates generally to the field of networking and communications and more specifically to a method of addressing networked devices.

Addressing methods were created out of the need to identify individual devices amongst groups of devices. The need for this identification is simple; how to identify one or more specific devices in a group, or network, of devices. Supplying individual devices unique identifiers, typically numbers, allows interaction or communication between specific devices; without this addressing information, a communications network would have to transmit data amongst all networked devices and there would be no method of determining which device or devices are intended to receive the transmitted data.

A typical address is usually a unique number or name assigned to a device participating in a network of devices. Devices are assigned address identifiers that reside on the devices and provide points of reference throughout a network. Many other technologies make use of the reference points such as routing algorithms, redundancy schemes, and diagnostic tools. Most all addresses are typically static information supplied to a device, that in most cases, never changes over the life of the device. The address itself simply resides on a device and serves its purpose as a reference point for other functions or protocols.

The basic idea behind addressing networked or interconnected communication devices has not changed much since its conception. Essentially the idea of supplying each device a unique identifier such as a number or name has remained the same. The scheme of numbering or naming has become more complex as technologies progress, as well as the manner in which identifiers are assigned, such as a server function assigning identifiers to new devices appearing on an existing network. These improvements, while allowing for more devices via larger addresses, or making the function of addressing devices easier, has not changed what addresses themselves can do for the network as a whole. Basically the idea behind addressing devices has not changed. Addresses reside on devices as static information that other functions or protocols make use of. The addresses themselves are not capable of serving any other functions.

Other network functions utilizing device addresses are the result of an outside process or protocol utilizing these address reference points to perform a function or service. Protocols such as PNNI (Private Network to Network Interface) a routing and fault management protocol for ATM (Asynchronous Transfer Mode), and SNMP (Simple Network Management Protocol) a popular management protocol for data networks, and other protocols use addresses to facilitate the protocols intended function. These other protocols typically come at additional cost, time, personnel, and training.

Devices with more than one communication port typically have to maintain one hardware address for each port on the device, this address is typically referred to as a MAC (Media Access Control) address. This simple limitation requires additional hardware and intelligence to manage the device as each port requires its own intelligence and address. Utilizing this method of addressing networked devices removes the need for each port to maintain a MAC address therefore removing the need for the additional hardware and intelligence resulting in less expensive access devices since the bulk of this addressing method can be managed from the core of the network.

This method of addressing network devices provides not only for simple device addressing as previously discussed, but also allows for and provides network management, fault monitoring, reduced complexity for access devices, and multiple port addressing. This method provides for these functions in the addressing itself, thereby eliminating the need for the additional complexity, cost, and hassles that come with additional protocols.

OBJECTS AND ADVANTAGES

The primary object of the invention is to provide a method of addressing networked devices.

Another object of the invention is to provide a method of addressing networked devices that allows said devices to support a plurality of ports and connections while maintaining only one hardware device address.

Another object of the invention is to provide a method of addressing networked devices that requires less intelligence in access devices by allowing the bulk of the addressing algorithm to reside on core devices, therefore lowering the complexity, and cost of said access devices.

An additional object of the invention is to provide a method of addressing networked devices that improves network and fault management by allowing the network infrastructure itself to monitor and report on the overall topology, connectivity, and associated hardware, with no additional protocols, software, infrastructure, or personnel.

A further object of the invention is to provide a method of addressing networked devices that provides the ability to begin mapping or tracing every connection or link in an unknown communication infrastructure, utilizing said method, from a single device address.

Other objects and advantages of the present invention will become apparent from the following descriptions, taken in connection with the accompanying drawings, wherein, by way of illustration and example, an embodiment of the present invention is disclosed.

SUMMARY

This method provides a manner in which to address or number devices in a communications infrastructure. Devices are divided into two groups, access devices and core devices. Each device in any communications network requires a name or number to uniquely identify itself amongst other devices. This method describes one such manner of numbering networked devices. This method also provides a number of additional functions and features that are gained as a result of utilizing this method in a communications infrastructure.

Devices are given numerical addresses by either assigning numbers, or by calculating the numbers. Access devices (FIG. 1) 12 will typically maintain one address, but core devices 10 will always maintain two addresses. The first address is assigned, and the second address is typically calculated or coded. For core devices 10, the first assigned address is utilized as a static reference point upon which the calculated addresses are created.

The different portions of the network, including the devices and their subparts, are assigned prime numbers to identify them; the exception is the Autonomous System Number, this number is not required to be a prime number, but it can be if desired. For example, a grouping of devices may be referred to as a network, and is assigned a prime number to identify this network from other networks. Core devices 10 themselves may also be assigned a prime number to identify them from other core devices 10. Further, core devices 10 may also have their sub-parts identified by prime numbers. As an example, each port card or blade may also be assigned a prime number to identify it from other port cards or blades; also individual ports on a port card or blade may also be assigned prime numbers to uniquely identify them on the blade, or port card.

The calculated or coded addresses rely on the static prime numbers assigned as a basis for creating the calculated or coded address. Each device whether access or core, will maintain only one calculated or coded address. This coded address will contain all device information relating to its makeup of sub-parts and its connectivity to other devices directly connected to it.

Decoding a calculated or coded device address properly will reveal all encoded device and connectivity information contained within. For example, if a coded core device address were to be decoded, the current makeup of the core device would be revealed as well as all current active connections to and from the core device. A request could then be sent from one of the active connections to another attached device requesting its address. Once this address is decoded and all information is retrieved, the process can repeat exponentially from all ports of all identified devices. From the information revealed from all retrieved addresses, a complete network map can be created and used as a reference for future monitoring, management, and fault checking.

Creating one of the seven portions of a device address requiring a coded or calculated number consist of using a data table FIG. 2 to record known device information such as the statically assigned prime numbers along with preset reference information. This reference information is simply a list of consecutive prime numbers starting with two and ending with the highest needed prime number for the given data table. Marker indicia (FIG. 7) 58 are placed inside the data table in locations that specify a relationship between the two sets of information. The inside of the data table is then numbered starting at the top left inner location 18 and numbered left to right, top to bottom, with consecutive prime numbers starting with two and ending with the last marker indicia. The locations in the data table comprising both marker indicia and a prime number are multiplied together to produce a product of the marked prime numbers. This product is utilized as the device address portion for which it was created.

There are two other methods of creating device address portions. First is by simply notating the number representing the portion of the network infrastructure required. For example, the Autonomous System Number (ASN) is never calculated or coded; therefore by simply notating the assigned ASN in the proper place of a coded device address, that portion of the completed device address can be created.

The second method of creating a device address portion is by simply multiplying together the numbers of the same portions of the network infrastructure. As an example, in coding an Expanse Number for a completed device address, simply multiply together the prime numbers representing each expanse in the network infrastructure or autonomous system. If there is only one expanse in the autonomous system then simply notate that number.

Decoding encoded device address portions is somewhat similar to encoding them. A similar data table FIG. 2 is created as was used in the creation of the address portion, and currently known information is placed in it along with the standard additional reference information of consecutive prime numbers. The inside of the data table is numbered as before. The number representing the device address portion is prime-factored to reveal the original prime numbers that created it. The numbers inside the data table that match the prime factored numbers are marked with marker indicia 58; and as a result, the original relationships are revealed. The process of decoding individual address portions must be followed in the correct order. The order is: Autonomous System Number, Expanse Number, Network Number, Network-element Number, Sub-Element Number, and Port Number. Decoding device address portions in this order will reveal the information needed to proceed with decoding the following address portion.

There is one other method of decoding an address portion; this is by simply prime-factoring the number representing that portion. This would apply to address portions created in the manner described above for Expanse Numbers.

DRAWINGS

The drawings constitute a part of this specification and include exemplary embodiments to the invention, which may be embodied in various forms.

FIG. 6 is a diagram of another possible construction of a data table with additional reference information, and placeholder identifiers in parentheses, used in the calculation or coding of core device sub-element numbers.

FIG. 7 is a diagram of a completed data table for an access device sub-element number.

Figure 1:
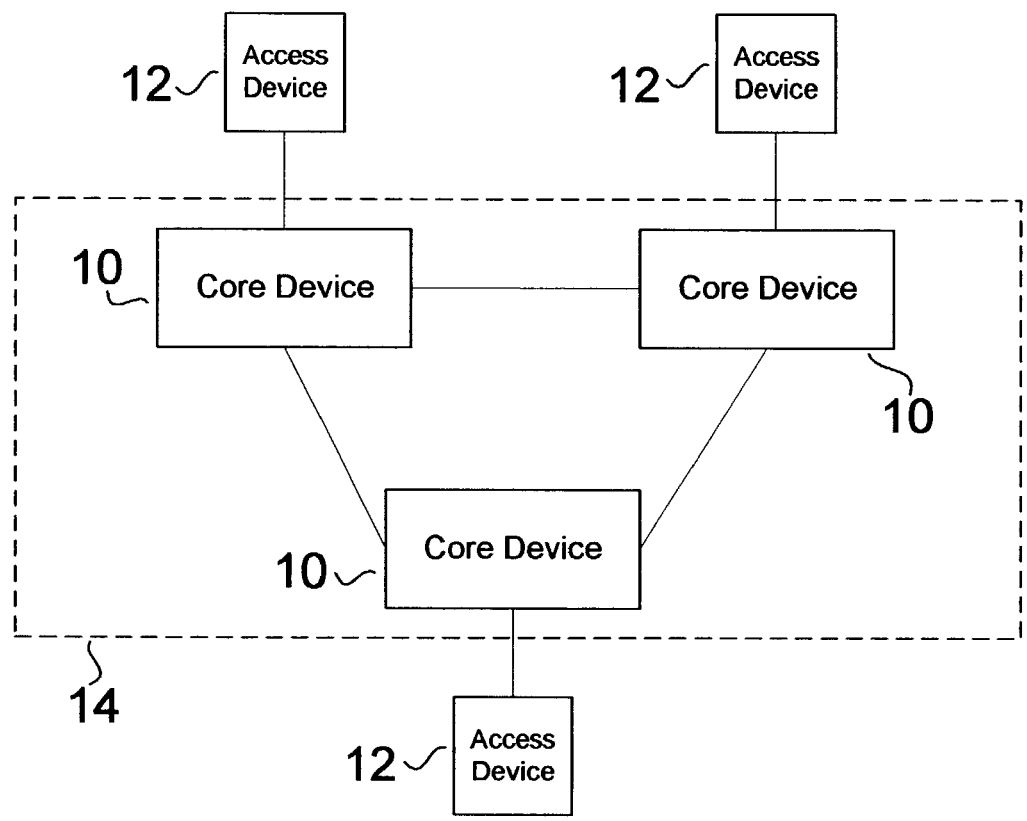
FIG. 1 is a diagram representing the basic layout of a group of interconnected access and core devices representing a communications infrastructure or means of communication.

REFERENCE NUMERALS 10 representation of a core device
12 representation of an access device
14 grouping known as core network, infrastructure, or backbone
16 unusable location or cell of data table
18 top left location or cell inside data table
20 placeholder indicia for actual reference information
22 place-holder indicia for actual reference information
24 additional reference information
26 placeholder indicia for actual reference information
28 additional reference information
30 placeholder indicia for actual reference information
32 placeholder indicia for actual reference information
34 placeholder indicia for actual reference information
36 placeholder indicia for actual reference information
38 placeholder indicia for actual reference information
40 placeholder indicia for actual reference information
42 additional reference information
44 placeholder indicia for actual reference information
46 placeholder indicia for actual reference information
48 additional reference information
50 additional reference information
52 actual reference information
54 reference indicia
56 additional reference information
58 mark or other usable indicia

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Introduction:

This method describes a manner of numbering or addressing all devices within a given group of connected devices; hereon referred to as a 'communications infrastructure', 'network', or 'network infrastructure'.

Why Addressing is Necessary:

In order for unrestricted functions, such as communication for example, to occur throughout a group of connected devices, comprising more than two devices, it is necessary to assign all devices, in the group of connected devices, an identifier. This identifier, hereon referred to as 'address', typically describes the location of the addressed device with relation to other addressed devices in the group of connected devices. The address of each device is unique to the group of addressed devices.

Two Types of Connected Devices FIG. 1:

This addressing method allows for two types of connected, or networked, devices. They are 'Core devices' 10 and 'Access devices' 12; both devices may also be known as 'network-elements'.

Core devices are devices that make up the main infrastructure, or backbone 14, of the group of connected devices or network. Core devices 10 consist of any device whose functions are solely dedicated the operation of the addressed network. Core devices 10 can also be further defined as devices that do not have the ability to support human user type interfaces such as personal computers for example; or devices that are consistent with other technologies that are not specifically the same as the addressed networks technology. Examples of core devices 10 typically include core switches, repeaters, and regenerators. Core devices 10 always connect to other core devices 10, and may or may not have access devices 12 directly connected to them.

This section may be summarized as providing a communications infrastructure comprising core and access devices interconnected for purposes of communication.

Access devices 12 are devices that allow 'access' to the communications infrastructure or backbone 14. These devices typically interface between the addressed networks infrastructure and another device, or devices facilities or infrastructure. The functions of these devices are not solely dedicated to the operation of the addressed network. These devices can translate between a human user's device, such as a personal computer, and the addressed networks infrastructure. Access devices are devices consisting of appropriate methods of connecting to the addressed network and another device, or devices, for purpose of translation between them. Access devices may be built as individual stand-alone devices or as a part of another device. Access devices always connect to core devices 10, and will never connect to other access devices 12.

Address Format:

The format of the address to be applied to each type of device, access and core, is as follows:

::Autonomous System Number:Expanse Number:Network Number:Network-element Number:Sub-Element Number: Port Number:Access device Hardware Address::

The address begins, is separated by, and ends with colons. The use of colons makes it easier to identify the address itself, and the different portions of the address. Double colons begin the address. Individual colons signify separation between portions of the address. Double colons also identify the end of the address.

The use of double colons to identify the beginning and ending of an address is not arbitrary. The length of the address format outlined herein is not limited. An address, or any portion of an address, may be any length as needed to accomplish the addressing of a given device. Since the length of these addresses is arbitrary, it is helpful to have a method of easily identifying the beginning and ending of addresses. When addresses are quoted in text, they will not be confused with other words or sentence structure since double colons are not typically considered correct use of punctuation. Double colon use will also help delimit the address from other information when transmitted between connected devices in a network. This will be especially helpful if it is deemed necessary for the address to undergo base number system translation from base ten (decimal) to base eighty-five (quinoctogesimal), also described herein.

The previous paragraph may be summarized as:

A method for indicating separate individual portions of a completed device address by utilizing colons, or other usable indicia.

Autonomous System Number—This number describes the individual stand-alone infrastructure that this addressing method describes. Autonomous system numbers may be assigned to different autonomous systems incrementally starting at number one. Autonomous system numbers should not be repeated. This number will be part of any address of an addressed device.

Expanse Number—This number describes sets of connected devices inside a given autonomous system. The expanse number may be used to describe groups of networks residing in the autonomous system. Expanse numbers are assigned in consecutive prime numbers starting at two. Expanse numbers cannot be repeated inside the same autonomous system, but may be reused in other autonomous systems. This number will be part of any address of an addressed device.

Network Number—This number describes a set of connected devices inside a given expanse. The network number may used to describe an individual network residing inside a given expanse. Network numbers are assigned in consecutive prime numbers starting at two. Network numbers cannot be repeated inside the same expanse, but may be reused in other expanses in the same autonomous system. This number will be part of any address of an addressed device.

Network-element Number—This number describes an individual core device 10 inside a given network. This number is present in an access device 12 address only in that it is describing the core device 10 or core devices to which the access device 12 is connected. This number may be used to describe a specific switching core device 10 in a given network for example. Network-element numbers may be assigned in consecutive prime numbers starting at two. Network-element numbers cannot be repeated inside the same network, but may be reused in other networks in the same expanse or other expanses. This number will be part of any address of an addressed device.

Sub-Element Number—This number describes an individual portion of a single network-element. The sub-element number may be used to describe specific groups of ports, or individual port cards, inside a specific network device for example. Sub-element numbers are assigned in consecutive prime numbers starting at two. Network-element numbers cannot be repeated inside the same network-element, but may be reused in other network-elements in the same network or other networks. This number may or may not be necessary when referring to a networked core device 10. This number will be a part of any addressed access device 12.

Port Number—This number describes an individual port or connection point of a given sub-element. The port number may be used to describe a specific connectivity port or interface on a given sub-element for example. Port numbers are assigned in consecutive prime numbers starting at two. Port numbers cannot be repeated inside the same sub-element, but may be reused in other sub-elements in the same network-element or other network-elements. This number may or may not be necessary when referring to a networked core device 10. This number will be a part of any addressed access device 12.

Access Device Hardware Address—This number is used to describe a specific and complete access device 12 regardless of current or future configuration or construction. This number will always be used to describe or identify a specific access device 12. This number will be assigned to the access device 12 during the manufacturing process. This number will not change over the life of the access device 12 even if the configuration of the device changes at a future date. This number is fixed and non-changeable. The overall length of this portion of the addressing scheme may or may not be fixed as determined by any possible authority that may, or may not, be created to be charged with assigning these numbers. This device will connect to the addressed networks infrastructure via interfaces or ports described by 'port number(s)'. This number will be a part of any addressed access device 12. This number will not be a part of any addressed core device 10.

Access Device Addresses:

Access device 12 addresses come in two forms: Hereon referred to as calculated, or coded and non-calculated. If an access device 12 has only one port connected to an addressed network infrastructure 14, the address of the access device 12 may or may not be calculated, or coded. However, it is recommended that the access device 12 also maintain a calculated address. If an access device 12 has more than one port connected to an addressed network infrastructure 14, the address of the access device 12 will always be calculated; there will not be a non-calculated address for a device connected in this manner. It is recommended that access devices always maintain a calculated address. If they do not, they will still function properly but some of the benefits of this method will be lost.

An access device 12 address identifies it uniquely in the autonomous system. It is used to locate a specific access device 12 inside this infrastructure. The access devices place in the infrastructure can be located by decoding the address. For example, the non-calculated decimal address ::1:2:2:3:17:3:12345:: tells us that the access device called '12345' can be found in autonomous system number one, expanse number two, network number two. The address further tells us that this access device is physically connected to port number three on sub-element number seventeen of network-element number three.

The same access device 12 may also maintain a calculated address. For a given access device, the calculated decimal address could be ::1:2:2:3:533:10:12345::. When properly decoded, this address will provide us with all the information of the non-calculated address plus additional information about the given access device 12. In this particular case, the calculated address will reveal the port number in use on the access device 12 as well as its connectivity to the port on the connected network-element.

Core Device Addresses:

Core device 10 addresses come in two forms: Calculated and non-calculated. All core devices maintain both a calculated address and a non-calculated address. The non-calculated address information may be extracted from the calculated address. A non-calculated address is assigned to every core device 10 at installation time.

The non-calculated address assigned by an installer need only identify the autonomous system the network-element belongs to, the expanse in the autonomous system the network-element belongs to, the network in the expanse the network-element belongs to, and a unique network-element number for the network-element or core device 10. The non-calculated address information identifies the core device 10 inside its current infrastructure 14. A typical non-calculated decimal address for a core device 10 may be ::1:2:2:3:: This tells us that core device number three resides in autonomous system one, expanse two, network two.

A typical calculated decimal address for a core device may be ::1:2:2:10465:36863914:10::. For this particular device, the non-calculated decimal address of ::1:2:2:3:: can be extracted from the calculated address when properly decoded. In addition, a calculated core device address will reveal all necessary connectivity information and current operational configuration for the network-element it addresses.

Addresses in General:

To identify if a given address, or portion of an address has been calculated, examine the expanse number, network number, network-element number, sub-element number, or port number to determine if that number can be mathematically prime factored. If the device expanse number, network number, network-element number, sub-element number, or port number can be mathematically prime factored, the address is calculated. If the device expanse number, network number, network-element number, sub-element number, or port number cannot be mathematically prime factored, the address is a non-calculated address.

Utilizing a calculated address to identify a device allows a vast amount of information about a device to be stored and therefore extracted from its calculated address. A calculated address contains all the information about the addressed devices current connectivity to any other device to which it is presently connected. Utilizing this addressing method allows extremely flexible connectivity between devices, ports, sub-elements, networks, and expanses without restriction.

This section may be summarized as assigning the communications infrastructure and portions of the communications infrastructure at least one of a plurality of predetermined identifiers represented by an assigned number.

How to create an access device address:

It is recommended that all access devices maintain a calculated address, however it is not required. If an access device 12 is currently connected to a core device 10 via one port only, it will not be required to maintain a calculated address. The non-calculated address will consist only of the numbers describing where the access device 12 is attached. For example: access device number '2468' may be attached to port five on sub-element number three of network-element seven, residing in network eleven, expanse three, autonomous system one. In this case, the access devices decimal address will be ::1:3:11:7:3:5:2468::.

If an access device 12 has more than one current connection to one or more core devices it will require a calculated address. The calculated address identifies the access device 12 uniquely in the addressed network infrastructure by describing how it is connected to the addressed networks infrastructure 14. For example: access device number '1234567' is connected to ports two and three on sub-element number seventeen of network-element number three, residing on network number two in expanse number two of autonomous system number one. In this case the decimal calculated address of the access device will be ::1:2:2:3:651:390:1234567::.

If an access device 12 with multiple connections to a networks infrastructure was given a non-calculated address instead of a proper calculated address, it would restrict the functionality of the addressed access device 12 to only functioning on the port listed in the non-calculated address. Therefore, it is recommended that all access devices with multiple active ports be given a calculated address. This does not limit an access device 12 constructed with multiple ports to only having calculated addresses. If an access device 12 constructed with multiple ports currently has only one of those ports currently connected to the networks infrastructure, a non-calculated address may be applied. If an additional port on this access device 12 is later connected to the networks infrastructure in any way, it will then be recommended to change the non-calculated access devices address to that of a calculated address; otherwise, the functionality of the newly connected port will be lost because it will not be identified to the networks infrastructure 14.

Calculated addresses are always dynamic. Since calculated addresses contain connectivity information, the address will change when there is a modification to the access device connectivity. Calculated addresses for access devices 12 always utilize all seven portions of the address format. Calculated addresses for core devices 10 never utilize the Access Device Hardware Address portion of the address format. This makes distinguish between calculated addresses for access device and calculated addresses for core devices easier.

To create a calculated address for an access device 12 the following procedure must be completed:

Step one. Note the autonomous system number to which the access device 12 is participating. Insert the selected autonomous system number in the 'Autonomous System Number' portion of the access device address.

Step two. If the access device 12 is connected to one or more core devices residing in the same expanse, the expanse number will not require calculating; note the number of the expanse to which the access device 12 is participating in the 'Expanse Number' portion of the address.

If the access device 12 is connected to multiple core devices residing in more than one expanse, the expanse number will have to be calculated; calculate the expanse number of the access device 12 by multiplying together the expanse numbers assigned to each currently active expanse to which the access device 12 participates. Note the product in the 'Expanse Number' portion of the address.

Step three. If the access device 12 is connected to one or more network-elements (core devices 10) residing in the same network, the network number will not require calculating; note the number of the network to which the access device 12 is participating in the 'Network Number' portion of the address and continue with step four.

If the access device 12 is connected to multiple core devices residing in more than one network, the network number will have to be calculated.

Figure 2:
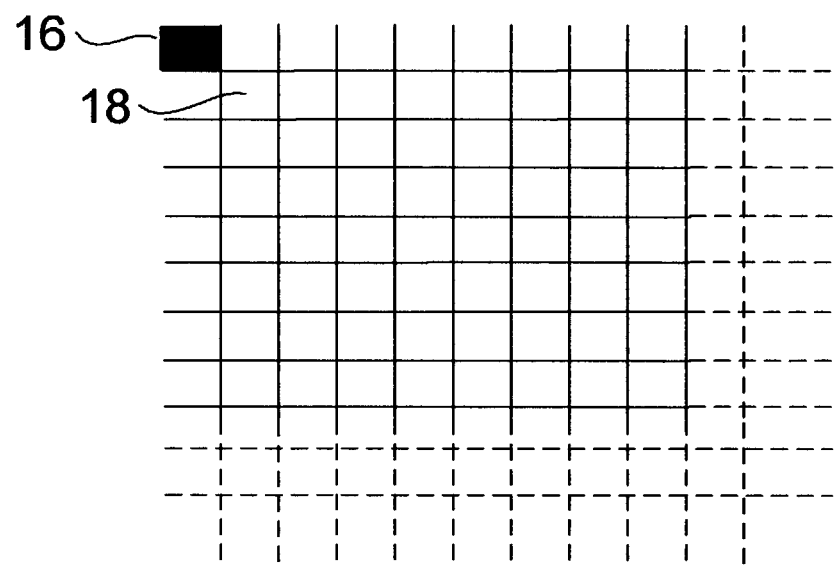
FIG. 2 is a diagram of a possible construction of a data table of various size without identifiers used in the calculation or coding of addresses.

Construct a data table similar to the one shown in FIG. 2 that contains a column for each expanse to which the access device 12 being addressed is connected, and an undetermined number of rows. The blacked part 16 of the data table is an unused area or location of the data table. This data table will be used to display a relationship between networks and expanses to which the access device 12 is connected and participating.

Numbered across the top of this data table is the expanse numbers of the expanses to which the access device 12 is connected and participating. The numbers should be listed across the top starting at the left of the data table above the top left inner cell 18 and continuing to the right horizontally in order from smallest to largest in ascending order. The numbers may be arranged in any other chosen order as long as the order stays consistent through the coding and decoding processes. Down the left side of this data table starting at the top to the left of the top left inner cell 18 should be listed consecutive prime numbers starting at two and listed down vertically to at least the highest prime number that represents the number of the largest network to which the access device 12 is connected.

Each vertical column represents an expanse to which the access device 12 is connected and participating. Each horizontal row represents a network to which the access device 12 may be connected and participating. The data table may be arranged in any manner that facilitates the creation of the relationships the data table is meant to establish, this includes the use of mathematical formulas as a substitute to the data table to produce the same results.

Locate the intersection or intersections of Expanses and Networks to which the access device 12 is connected and participating. Place markers (FIG. 7) 58 at all intersections of column/row(s) of the referenced expanse/network(s) to which the access device 12 is connected and participating.

Starting at the top left inner cell 18, or intersection, of the inside portion of the data table, number each cell, or intersection, left to right top to bottom, with a consecutive prime number starting with two and continue until the last marker 58 inside the data table has been numbered. Locate the marks 58 inside the data table that are now numbered and multiply all marked numbers together. The product is the calculated network number and should be placed in the 'Network Number' portion of the address.

Step four. If the access device 12 is connected to only one network-element (core device 10), the network number will not require calculating; note the number of the network-element to which the access device 12 is to be connected in the 'Network-element Number' portion of the address and continue with step five.

If the access device 12 is connected to more than one network-element, the network-element portion of the address will be calculated.

Construct a data table FIG. 2 that contains a column for each expanse/network that the access device 12 being addressed is connected and an undetermined number of rows that will display a relationship between network-elements and networks to which the access device 12 is currently connected.

Numbered across the top of this data table will be the expanse/network identifier of each expanse/network to which the access device 12 is connected and participating. The expanse/network identifiers should be listed across the top of the data table starting at the left side of the top of the data table above the inner top left cell 18 and continuing horizontally to the right from lowest expanse/network number to the highest expanse/network number. The numbers may be arranged in any other chosen order as long as the order stays consistent through the coding and decoding processes. The ordering should start with the expanse number and move to the other numbers incrementally to determine order. For example 2/3 is lower than 2/7, 3/5, or 3/2. The proper order for these numbers would be 2/3, 2/7, 3/2, and 3/5 for example.

Down the left side of this data table 56 starting to the left of the top left inner cell 18 should be listed consecutive prime numbers starting at two and listed down vertically to the highest prime number that is at least equal the number of the largest network-element number to which the access device 12 is connected.

Each vertical column represents an expanse/network to which the access device 12 is participating. Each horizontal row represents a network-element to which the access device 12 may be connected. The data table may be arranged in any manner that facilitates the creation of the relationships the data table is meant to establish, this includes the use of mathematical formulas as a substitute to the data table to produce the same results.

Locate the intersection or intersections of expanse/networks and network-elements to which the access device 12 will be connected and participating. Place markers 58 at each intersection representing expanse/networks and network-elements to which the access device 12 is connected and participating.

Starting at the top left inner cell 18, or intersection, of the inside portion of the data table, number each cell, or intersection, left to right top to bottom, with a consecutive prime number starting with two and continue until the last marker 58 inside the data table has been numbered. Locate the numbers inside the data table that are now marked and multiply them together. The product is the calculated network-element number and should be placed in the 'Network-element Number' portion of the address.

Step five. The Sub-element portion of the address for an access device 12 requiring a calculated address will always require a calculated sub-element number regardless of how many sub-elements to which the access device 12 is actually connected.

Figures 6, 7:
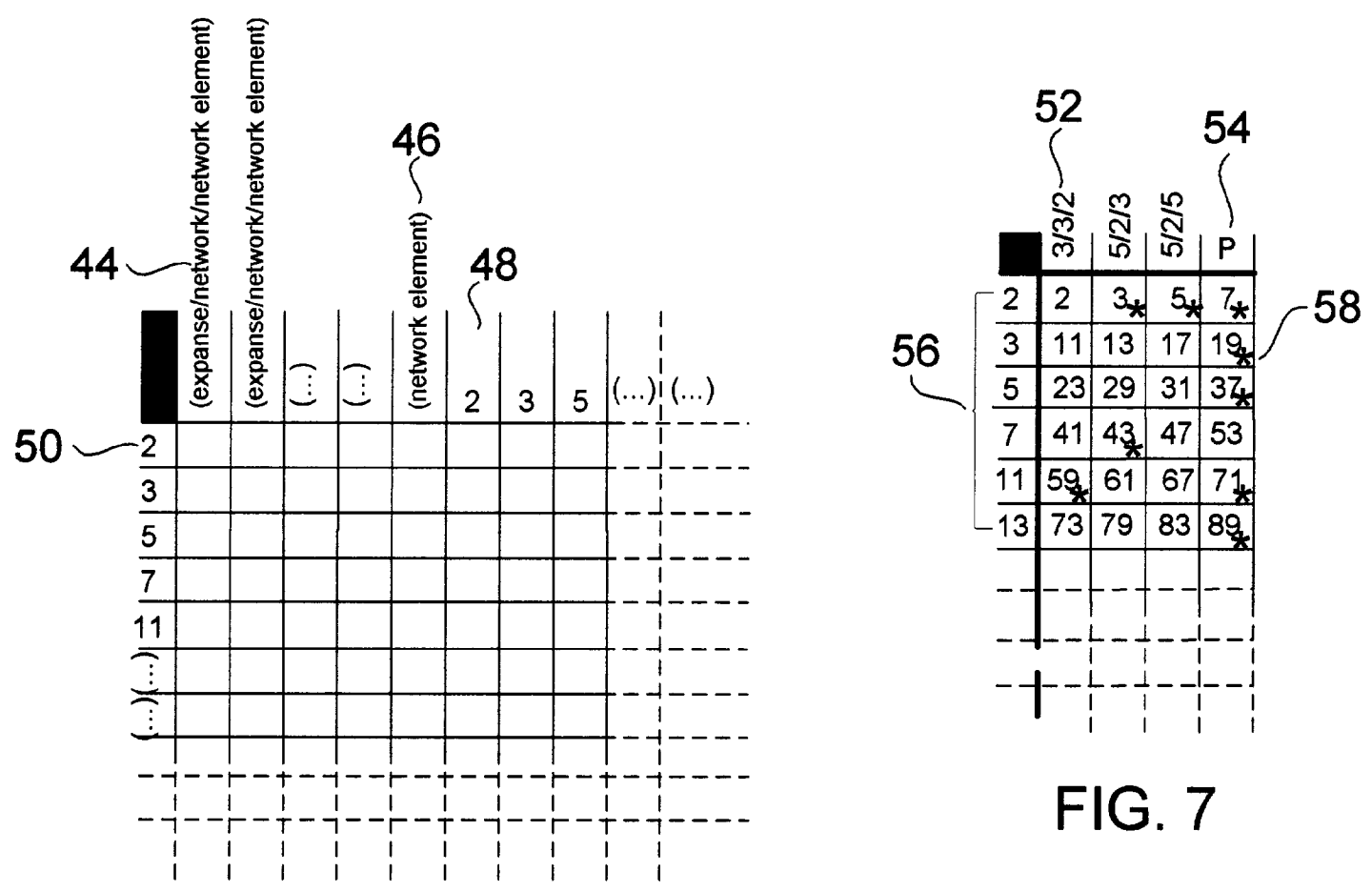

A sample completed access device 12 sub-element data table for an access device having a sub-element address portion of '1183350630945' is shown in FIG. 7

Figure 3:
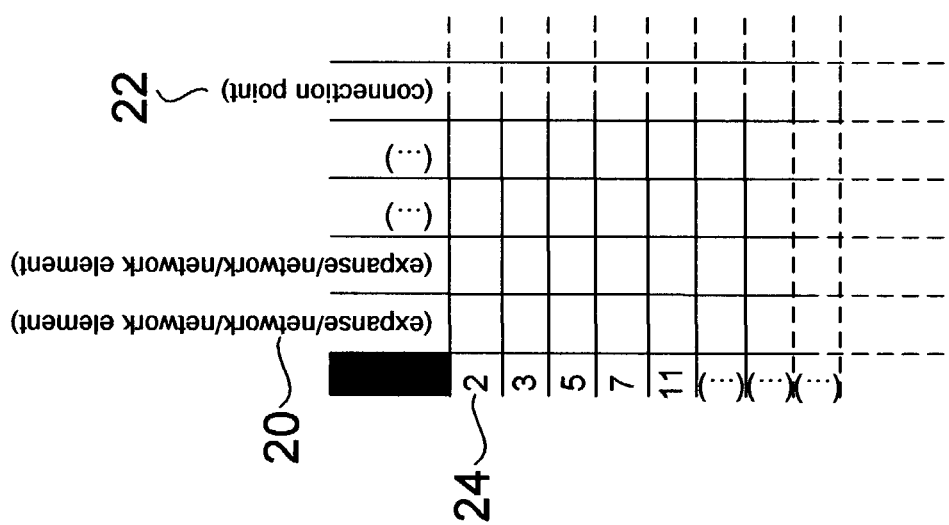
FIG. 3 is a diagram of a possible construction of a data table with additional reference information, and placeholder identifiers in parentheses, used in the calculation or coding of access device sub-element numbers.

Construct a data table FIG. 3 that contains a column for each expanse/network/network-element plus an additional column for access device 12 ports or connection points, and an undetermined number of rows that will display a relationship between network-elements 20, sub-elements, and ports or connection points 22.

Numbered across the top of this data table will be the expanse/network/network-element identifier 20 52 of each expanse/network/network-element to which the access device 12 is connected and participating. The expanse/network/network-element identifiers should be listed across the top of the data table starting at the left side of the data table above the top left inner cell 18 and continuing horizontally to the right from lowest expanse/network/network-element number to the highest expanse/network/network-element number. The numbers may be arranged in any other chosen order as long as the order stays consistent through the coding and decoding processes. The ordering should start with the expanse number and move to the other numbers incrementally to determine order. For example 2/3/7 is lower than 2/3/11, 2/5/3, or 3/2/5. The proper order for these numbers would be 2/3/7, 2/3/11, 2/5/3, and 3/2/5 for example. The additional column could have a header 22 marking 54 that represents port or connection point numbers on the access device 12 being addressed that are currently connected and operational, or are available on the given access device 12.

Down the left side of this data table 56 starting to the left of the top left inner cell 18 should be listed consecutive prime numbers 24 starting at two and listed down vertically to the highest prime number that is at least equal the number of the largest network sub-element number to which the access device 12 is connected, or the largest number representing the largest port number on said access device 12; whichever is larger.

Each vertical column, except the last vertical column, represents an expanse/network/network-element to which the access device 12 is connected and participating. The last vertical column represents connection points or ports 22 on the access device 12 being addressed. Each horizontal row represents a network sub-element to which the access device 12 may be connected. The order of the expanse/network/network-element numbers and the vertical column representing ports on the access device 12 across the top of the data table may be arranged in any other chosen order as long as the order stays consistent through the coding and decoding processes. The data table may be arranged in any manner that facilitates the creation of the relationships the data table is meant to establish, this includes the use of mathematical formulas as a substitute to the data table to produce the same results.

Locate the intersection or intersections of Expanse/Networks/Network-elements and Network Sub-elements to which the access device 12 is connected and participating. Place markers 58 at each intersection representing expanse/networks/network-elements and network sub-elements to which the access device 12 is connected and participating. The last column is handled differently. The last column represents ports on the access device 12 being addressed with this method. In the last column representing ports on the access device 12 being addressed, place a marker 58 in each row that is represented by a prime number down the left side of the data table 56 indicating a port that is in use on the access device 12 being addressed, or place a marker in each row that is represented by a prime number down the left side of the data table 56 indicating all ports the access device 12 has as a part of its construction whether or not they are currently in use.

Starting at the top left inner cell 18, or intersection, of the inside portion of the data table, number each cell, or intersection, left to right top to bottom, with a consecutive prime number starting with two and continue until the last marker 58 inside the data table has been numbered. Locate the marks 58 inside the data table that are now numbered and multiply all marked numbers together. The product is the calculated sub-element number and should be placed in the 'Sub-element Number' portion of the address.

Step Six. The port number portion of the address for an access device 12 requiring a calculated address will always require a calculated port number regardless of how many ports to which the access device 12 is actually connected. The optional calculated address for an access device 12 that does not require a calculated address will also require this number to be calculated for its port number portion of the address.

Figure 4:
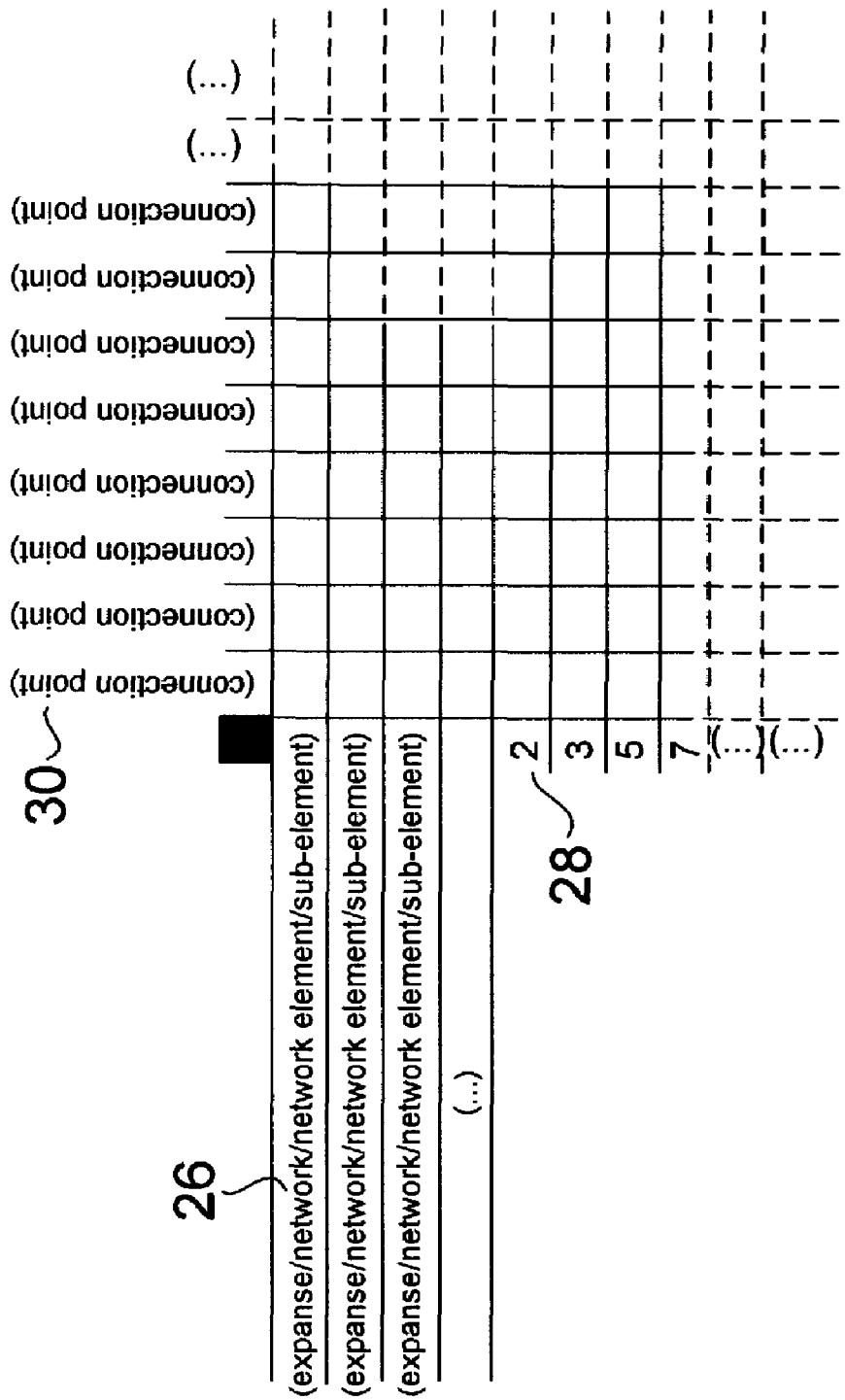
FIG. 4 is a diagram of a possible construction of a data table with additional reference information, and placeholder identifiers in parentheses, used in the calculation or coding of access device port numbers.

Construct a data table FIG. 4 that contains a column for each port chosen in the previous step plus an undetermined number of rows that displays a relationship between network sub-elements 26, sub-element ports 28, and to which ports 30, on the access device 12 being addressed, they are connected.

Numbered across the top of the data table are the numbers of the access device 12 ports or connection points 30, these are the same ports that were chosen in the previous step. These numbers are listed across the top starting at the left of the data table above the top left cell 18 and numbered in ascending order from left to right horizontally across the top of the data table. The numbers may be arranged in any other chosen order as long as the order stays consistent through the coding and decoding processes.

Down the left side of the data table is listed the expanse/network/network-element/sub-element number 26 for each currently active sub-element connected to the access device 12 being addressed, listed vertically from the top to the left of the top left inner cell 18 to bottom in ascending order. The numbers may be arranged in any other chosen order as long as the order stays consistent through the coding and decoding processes. The ordering could start with the expanse number and move to the other numbers incrementally to determine order. For example 2/3/7/2 is lower than 2/3/7/3, 2/5/3/2, or 3/2/3/2. The proper order for these numbers would be 2/3/7/2, 2/3/7/3, 2/5/3/2, and 3/2/3/2 for example. Once the expanse/network/network-element/sub-element identifiers have all been listed, continue the numbering down the left side of the data table with consecutive prime numbers 28 starting with two and ending with at least the number representing the highest currently active port on a sub-element to which the access device 12 being addressed is connected.

Each column represents an access device 12 port 30 to which may or may not be connected a currently active port on a given currently active sub-element, dependant on previous step. Each row represents either a currently active sub-element 26, or a possible port 28 of a given currently active sub-element listed somewhere above it. The data table may be arranged in any manner that facilitates the creation of the relationships the data table is meant to establish, this includes the use of mathematical formulas as a substitute to the data table to produce the same results.

The process of selecting and marking intersections in this data table may begin with any identifier the data table is meant to relate. For sake of explanation, a specific identifier will be chosen to begin with. Refer to a specific sub-element row 26 listed in the data table and move across the data table to the right to the intersection of the sub-element 26 and the access device 12 port number 30 to which the sub-element has a connection and place a marker 58 at that intersection, then drop down that same column to the listed prime numbers representing possible active sub-element port numbers 28 and place a mark 58 at the intersection of the access device 12 port number 30 and the prime number 28 representing the port on the sub-element to which the access device 12 port is connected. Continue this process for all sub-elements, and access device 12 port numbers.

If in the previous step, all available access device 12 ports were listed regardless of whether or not they are in use, there may be some columns without markings; these columns represent access device 12 ports that are not currently in use. If in the previous step, only active access device 12 ports are listed, all columns should have two markings in them.

Starting at the top left inner cell 18, or intersection, of the inside portion of the data table, number each cell, or intersection, left to right top to bottom, with a consecutive prime number starting with two and continue until the last marker inside the data table has been numbered. Locate the numbers inside the data table that are now marked and multiply them together. The product is the calculated port number and should be placed in the 'Port Number' portion of the address.

Step seven. Note the access device 12 hardware address, which was assigned to the access device 12 at the time of manufacture, in the appropriate portion of the address. The appropriate portion of the address for the device hardware address is the last or seventh portion of the address, named 'Access device Hardware Address'.

This completes the basic formation of a calculated address for an access device 12.

It may be found desirable to convert the resulting address, section by section, to another mathematical numbering base system in order to reduce the size, or number of digits of the resulting address to a more manageable size; recommendations on this are also included as a part of this method.

All core devices will maintain both a non-calculated address and a calculated address. A non-calculated address is assigned to every core device 10 at installation time, and may be reassigned at any given point if necessary.

The non-calculated address is only required to identify the autonomous system the network-element belongs to, the expanse in the autonomous system the network-element belongs to, the network in the expanse the network-element belongs to, and a unique network-element number for the network-element or core device 10; but it may also include other information if necessary. Any information placed in a non-calculated core device 10 address other than autonomous system number, expanse number, network number, and network-element number will not be included in the core devices calculated address. The non-calculated address information identifies the network-element inside its current infrastructure. A typical non-calculated decimal address for a core device 10 may be ::1:2:2:3::. This tells us that core device number three resides in autonomous system one, expanse two, network two.

Calculated addresses for core devices contain information about the core devices active configuration, and its connectivity to the other devices around it including access devices. Calculated addresses are always dynamic. Since calculated addresses contain current configuration and connectivity information, the address will change when there is a modification to the core devices configuration or connectivity. Calculated core device 10 addresses utilize six of the seven portions of this methods address format. Calculated core device 10 addresses never utilize the Access Device Hardware Address portion of the address format. This makes it easier to distinguishing between calculated addresses for access devices and calculated addresses for core devices.

To create a calculated address for a core device 10 the following procedure must be completed.

Step one. Note the autonomous system number to which the core device 10 is participating, and insert the selected autonomous system number in the 'Autonomous System Number' portion of the core devices address.

Step two. If the core device 10 is connected to one or more core devices residing in the same expanse, the expanse number will not require calculating; note the number of the expanse to which the core device 10 is participating in the 'Expanse Number' portion of the address and continue with step three.

If the core device 10 is connected to multiple core devices residing in more than one expanse, the expanse number will have to be calculated; calculate the expanse number of the core device 10 to be addressed by multiplying together the expanse numbers assigned to each currently active expanse to which the core device 10 to be addressed is participating. Note the product in the 'Expanse Number' portion of the address.

Step three. If the core device 10 is connected to one or more network-elements in the same network, the network number will not require calculating; note the number of the network to which the access device 12 is participating in the 'Network Number' portion of the address and continue with step four.

If the core device 10 is connected to multiple core devices residing in more than one network, the network number will have to be calculated.

Construct a data table FIG. 2 that contains a column for each expanse to which the core device 10 being addressed is connected and an undetermined number of rows that displays a relationship between networks and expanses to which the core device 10 is connected and participating.

Numbered across the top of this data table is the expanse numbers of the expanses to which the core device 10 will be participating; these numbers will be identical to the numbers determined in the previous step of this procedure. The numbers should be listed across the top starting at the left of the data table above the top left cell 18 and continuing to the right horizontally in order from smallest to largest in ascending order. The numbers may be arranged in any other chosen order as long as the order stays consistent through the coding and decoding processes. Down the left side of this data table starting to the left of the top left inner cell 18 should be listed consecutive prime numbers starting at two and listed down vertically to at least the highest prime number that represents the number of the largest network to which the core device 10 is connected.

Each vertical column represents an expanse to which the core device 10 is participating. Each horizontal row represents a network to which the core device 10 may be participating. The data table may be arranged in any manner that facilitates the creation of the relationships the data table is meant to establish, this includes the use of mathematical formulas as a substitute to the data table to produce the same results.

Locate the intersected cell or cells of Expanses and Networks to which the core device 10 is connected and participating. Place markers 58 at all intersections of column/row(s) of the referenced expanse/network(s) to which the core device 10 is connected and participating.

Starting at the top left inner cell 18, or intersection, of the inside portion of the data table, number each cell, or intersection, left to right top to bottom, with a consecutive prime number starting with two and continue until the last marker inside the data table has been numbered. Locate the numbers inside the data table that are now marked and multiply them together. The product is the calculated network number and should be placed in the 'Network Number' portion of the address.

Step four. Network-element numbers for core devices will always require creation of a data table due to the information contained in the resulting network-element number.

Figure 5:
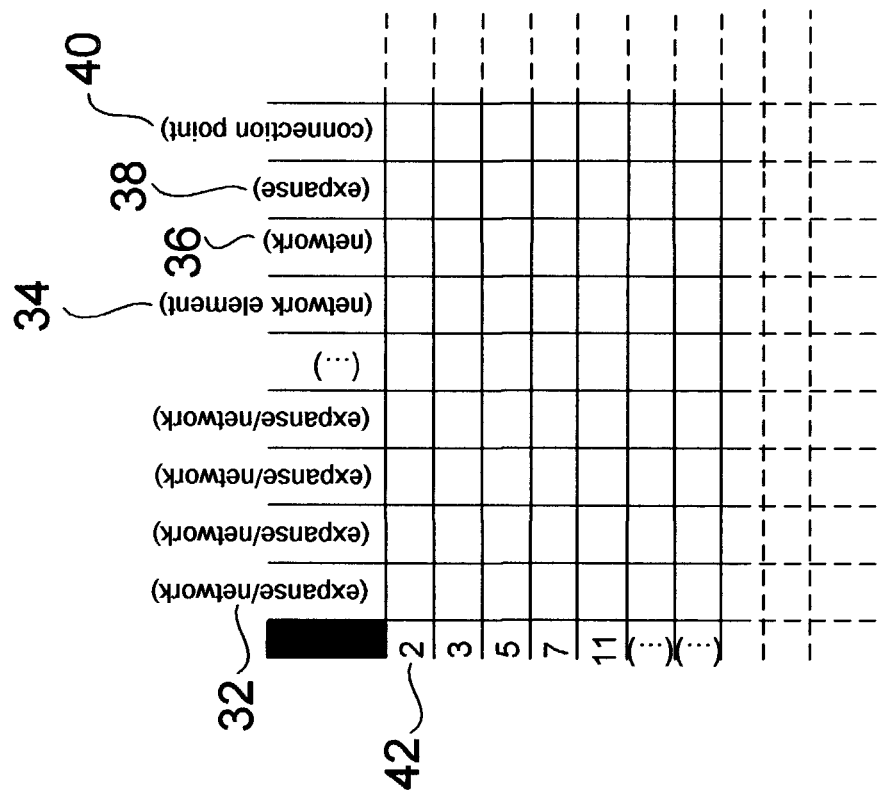
FIG. 5 is a diagram of another possible construction of a data table with additional reference information, and placeholder identifiers in parentheses, used in the calculation or coding of core device network-element numbers.

Create a data table FIG. 5 that contains a column for each expanse/network 32 plus four additional columns 34 36 38 40 and an undetermined number of rows that displays a relationship between network-elements, networks 32, and non-calculated core device 10 address information 34 36 38.

Numbered across the top of this data table are the non-calculated expanse/network numbers 32 of other core devices to which the core device 10 being addressed is attached or connected. Following the expanse/network numbers 32 across the top are four additional columns 34 36 38 40 indicating the non-calculated network-element information of the core device 10 to be addressed. These indicators specify the non-calculated network-element number 34 of the core device 10 being addressed, the non-calculated network number 36 to which the core device 10 being addressed is connected and participates, the non-calculated expanse number 38 to which the core device 10 being addressed is connected and participates, and the number of the largest port utilized 40 on the core device 10 being addressed; this last number 40 is needed for the next step and also for decoding the address later.

The expanse/network numbers 32 should be listed across the top starting at the left of the data table above the top left cell 18 and continuing to the right horizontally in order from smallest to largest in ascending order. The numbers may be arranged in any other chosen order as long as the order stays consistent through the coding and decoding processes. The ordering should start with the expanse number and move to the other numbers incrementally to determine ascending order. For example 2/3 is lower than 2/7, 3/5, or 3/2. The proper order for these numbers would be 2/3, 2/7, 3/2, and 3/5 for example. Immediately following the expanse/network numbers across the top are the additional columns 34 36 38 identifying the non-calculated address information of the core device 10 being addressed and the additional column noting the largest port number 40 used on the device being addressed. The order of the additional columns across the top of the data table may be arranged in any other chosen order as long as the order stays consistent through the coding and decoding processes.

Down the left side of this data table should be listed consecutive prime numbers 42 starting at two at the top to the left of the top left inner cell 18 and listed down vertically to the highest prime number that is at least equal the number of the largest network-element number to which the core device 10 being addressed is connected, the highest network-element number 34, network number 36, or expanse number 38 that is associated with the core device 10 being addressed, or the largest port number 40 on the core device 10 being addressed; whichever is largest.

The columns of the data table represent either expanse/network numbers 32 to which network-elements belong, or non-calculated addressing information 34 36 38 40 about the core device 10 being addressed. The rows down the left side of the data table represent possible network-element numbers 42. The data table may be arranged in any manner that facilitates the creation of the relationships the data table is meant to establish, this includes the use of mathematical formulas as a substitute to the data table to produce the same results.

Referring to the network/expanse identifiers 32 across the top and the prime numbers listed down the left side 42 of the data table, locate and mark intersected cells that relate expanse/network numbers 32 to the network-elements represented by prime numbers 42 to which the core device 10 being addressed is directly connected. In the columns indicating non-calculated core device 10 information 34 36 38 for the core device 10 being addressed; locate and mark intersections that indicate the appropriate information utilizing the prime numbers 42 down the left side of the data table; for example, if the device being addressed resides in network number five, place a mark in the cell intersecting the network number column 36 and the row that is numbered five via consecutive prime numbers 42. In the last column representing a port number 40; drop down that column to the intersecting cell of the prime number 42 along the left side of the data table that is equal to the largest port number being utilized on the core device 10 being addressed and place a mark in it. The information contained in the additional columns is required for the decoding process.

Starting at the top left inner cell 18, or intersection, of the inside portion of the data table, number each cell, or intersection, left to right top to bottom, with a consecutive prime number starting with two and continue until the last marker 58 inside the data table has been numbered. Locate the numbers inside the data table that are now marked and multiply them together. The product is the calculated network-element number, and should be placed in the 'Network-Element Number' portion of the address.

Step five. All core devices will require a calculated sub-element address.

Create a data table FIG. 6 that contains a column for each expanse/network/network-element 44 to which the core device 10 being addressed it attached, an additional column for the core device 10 itself 46, a number of additional columns 48 equal to the number of prime numbers from two to the largest port number utilized on the core device 10 itself as determined in the previous step, and an undetermined number of rows. This data table will display a relationship between expanse/network/network-elements 44, port numbers in use by the core device 10 being addressed 48, and sub-element numbers.

Numbered across the top of this data table are the expanse/network/network-element numbers 44 of other core devices to which the core device being addressed is attached including an additional column 46 for the network-element being addressed. Following these columns across the top the top are additional columns 48; the additional columns across the top are columns to identify the port numbers in use on the core device being addressed.

The expanse/network/network-element numbers 44 should be listed across the top starting at the left of the data table above the top left inner cell 18 and continue to the right horizontally in order from smallest to largest in ascending order. The ordering should start with the expanse number and move to the other numbers incrementally to determine ascending order. For example 2/3/7 is lower than 2/3/11, 2/5/3, or 3/2/5. The proper order for these numbers would be 2/3/7, 2/3/11, 2/5/3, and 3/2/5 for example.

Immediately following the expanse/network/network-element numbers including the column 46 for the network-element being addressed, across the top are the additional columns to identify the port numbers 48 of the core device 10 being addressed. These columns should be numbered with consecutive prime numbers starting at two and continue until the largest port number in use on the network-element being addressed as determined in the previous step. The numbers and columns may be arranged in any other chosen order as long as the order stays consistent through the coding and decoding processes.

Down the left side of this data table should be listed consecutive prime numbers 50 starting at two at the top to the left of the top left inner cell 18 and listed down vertically to the highest prime number that is at least equal to the number of the largest network sub-element number to which the core device 10 to be addressed is related, or to the highest port number that is associated with the core device 10 to be addressed, whichever is largest.

The columns of the data table represent either expanse/network/network-element numbers 44 that contain sub-elements, or port numbers 48 of the core device 10 being addressed. The rows down the left side of the data table 50 represent possible sub-element numbers. The data table may be arranged in any manner that facilitates the creation of the relationships the data table is meant to establish, this includes the use of mathematical formulas as a substitute to the data table to produce the same results.

Referring to the network/expanse/network-element identifiers 44 across the top including the column for the network-element 46 of the core device 10 being addressed and the prime numbers listed down the left side of the data table 50, locate and mark 58 intersected cells that relate expanse/network/network-elements numbers 44 to the sub-elements numbers represented by the prime numbers 50 of the same devices to which the core device 10 being addressed is directly connected. For example, if network-element five contains sub-elements seven and eleven that are connected to the core device 10 being addressed, place marks 58 in the cells that intersect network-element five and sub-element numbers seven and eleven; this also includes marking the intersected cells in the column 46 representing the core device 10 being addressed to show its' own active sub-elements.

In the columns indicating port numbers 48 forte core device 10 being addressed, reference the marked 58 sub-element numbers 50 of the core device 10 being addressed 46 one at a time, and move across the associated row to the right to the intersected cell, indicated by a port number 48 above, of each active port on the sub-element of the core device 10 being addressed (this may or may not include ports attached to access device as desired) and mark 58 each appropriate intersection.

Starting at the top left inner cell 18, or intersection, of the inside portion of the data table, number each cell, or intersection, left to right top to bottom, with a consecutive prime number starting with two and continue until the last marker inside the data table has been numbered. Locate the numbers inside the data table that are now marked 58 and multiply them together. The product is the calculated sub-element number and should be placed in the 'Sub-Element Number' portion of the address.

Step six. The port number, or connection point number, portion of the address for a core device 10 will always require a calculated port number regardless of how many ports there are to other devices.

Construct a data table similar to FIG. 4. This data table will only be different in that the reference information listed across the top of the data table will be different, other than that, this data table will be used the same way as the data table created for the port number of an access device. This data table should contain a column for each sub-element/port (instead of connection point) of the core device 10 being addressed and an undetermined number of rows that displays a relationship between network sub-elements 26, sub-element/ports, and which specific active ports 28 on the sub-elements 26 of other core device 10 are connected to the core device 10 being addressed. This data table is very similar to the port number data table created for an access device; the only difference is in listing the sub-element/port numbers across the top instead of only listing the port numbers.

Numbered across the top of the data table are the non-calculated sub-element/port numbers of the core device 10 being addressed. These are the same sub-element/port numbers that were related and coded in the previous step. These numbers are listed across the top starting at the left of the data table above the top left inner cell 18 and numbered in ascending order from left to right horizontally across the top of the data table. The numbers may be arranged in any other chosen order as long as the order stays consistent through the coding and decoding processes.

Down the left side of the data table is listed the expanse/network/network-element/sub-element identifier 26 for each currently active sub-element of other devices connected to the core device 10 being addressed listed vertically from the top to the left of the top left inner cell 18 to the bottom in ascending order. The numbers may be arranged in any other chosen order as long as the order stays consistent through the coding and decoding processes. The ordering could start with the expanse number and move to the other numbers incrementally to determine order. For example 2/3/7/2 is lower than 2/3/7/3, 2/5/3/2, or 3/2/3/2. The proper order for these numbers would be 2/3/7/2, 2/3/7/3, 2/5/3/2, and 3/2/3/2 for example. Once the expanse/network/network-element/sub-element identifiers 26 have all been listed, continue the numbering down the left side of the data table with consecutive prime numbers 28 starting with two and ending with at least the number representing the highest currently active port on a sub-element to which the core device 10 being addressed is connected.

Each column represents a currently active core device 10 port of the core device 10 being addressed to which will be connected a currently active port on a given currently active sub-element 26 of another core device 10. Each row represents either a currently active sub-element of another device 26, or a possible port 28 of a given currently active sub-element listed somewhere above it. The data table may be arranged in any manner that facilitates the creation of the relationships the data table is meant to establish, this includes the use of mathematical formulas as a substitute to the data table to produce the same results.

The process of selecting and marking intersections in this data table may begin with any identifier the data table is meant to relate. For sake of explanation a specific identifier will be chosen to begin with. Refer to a specific sub-element/port column of the core device 10 being addressed listed across the top of the data table and move down the column to the intersected cell of the expanse/network/network-element/sub-element 26 of the core device 10 connected to the current sub-element/port listed above and place a marker 58 at that intersection, then drop down to that column to the listed prime numbers 28 representing possible active sub-element ports numbers on the sub-element 26 previously marked above and place a mark 58 at the intersection of the core device 10 sub-element/port number and the prime number 28 representing the port on the sub-element to which the core device 10 being addressed port is connected. Continue this process for all ports of the core device 10 being addressed. Once completed, each column will show each port on the core device 10 being addressed, and to which sub-elements 26 and ports 28 on other devices the ports on the core device 10 being addressed are connected.

If in step five all active core device 10 ports were listed regardless of whether or not they are in use by an access device 12, there may be some columns without markings, these columns represent ports connected to access device. If in step five only ports connected to other core devices were listed, all columns will show markings. All columns with markings should have two markings in them.

Starting at the top left inner cell 18, or intersection, of the inside portion of the data table, number each cell, or intersection, left to right top to bottom, with a consecutive prime number starting with two and continue until the last marker inside the data table has been numbered. Locate the numbers inside the data table that are now marked and multiply them together. The product is the calculated port number and should be placed in the 'Port Number' portion of the address.

This completes the basic formation of a calculated address for a core device 10.

It may be found desirable to convert the resulting address, section by section, to another mathematical numbering base system in order to reduce the size, or number of digits of the resulting address to a more manageable size; recommendations on this are also included as a part of this method.

This section may be summarized as:

Creating one of a plurality of device address portions by one of the following as required:

Notate the assigned number identifying the communications infrastructure, or a portion of the communications infrastructure, or;

Produce the product of at least two assigned numbers representing the same portion of the communications infrastructure, or;

Code a Device Address Portion by:

Utilizing a data table or other usable construct to identify and inter-relate a plurality of information relating to the device address portion of the communications infrastructure.

List a plurality of information and an additional reference information in relatable locations in the data table or other usable construct.

Notate locations in the data table or other usable construct to identify relationships between a plurality of device information and additional reference information by placing usable indicia in appropriate relatable locations.

Place numbers in appropriate locations in the data table or other usable construct.

Calculate the product of the numbers in the data table or other usable construct locations also comprising the usable indicia.

Repeat step of creating one of a plurality of device address portions by one of the following as required for each required portion of a completed device address.

Assemble a completed device address by arranging the plurality of device address portions in a predetermined order.

This completes the process of creating device addresses.

Method of extracting or decoding the encoded information from calculated addresses:

The method of decoding the calculated addresses is somewhat similar to the encoding method. The easiest method of decoding the address is to decode it in the same order it was encoded. Start with step one of the encoding process for the appropriate calculated address, either core device 10 or access device 12; decode it, take the information revealed and move to the next step. This process does not exclude the possibility of utilizing other mathematical methods of decoding calculated addresses such as optional data table, chart types, or mathematical formulas.

Prime factorization is the main mathematical tool utilized in decoding calculated addresses. Addresses are decoded one portion at a time starting with the expanse number (if calculated). Prime factorization is executed by dividing out the smallest possible prime number (usually two or free to start with) from the address portion, noting that number, and repeating the process on the remainder. This process is repeated until it cannot be repeated any more. This will always reveal the original numbers that were multiplied together to create a portion of an address.

This paragraph may be summarized as:

Prime factoring one of a plurality of device address portions by: Dividing out the smallest possible prime number from one of a plurality of device address portions thereby resulting in a prime number and a remainder.

Notating the smallest possible prime number.

Repeating previous steps in sequential order on the remainder until the previous steps can no longer be repeated thereby resulting in the original prime numbers used to create the device address portion.

Decoding a calculated access device 12 address in the base ten numbering system:

Step one. Autonomous System Number

The Autonomous System number is never calculated.

Step two. Expanse Number

The Expanse number may or may not be calculated; if the expanse number portion of the address can be prime factored this indicates that the number is calculated. Decoding a calculated expanse number will reveal the expanses to which the access device 12 is participating.

To Decode a Calculated Expanse Number:

Prime factor the expanse number portion of the address; the resulting numbers represent the expanses to which the access device 12 is connected.

Step three. Network Number

The network number may or may not be calculated; if the network number portion of the address can be prime factored this indicates the number is calculated. Decoding a calculated network number will reveal the networks to which the access device 12 is participating, and the expanses in which the revealed networks reside.

To Decode a Calculated Network Number:

Create a data table FIG. 2 containing a column for each expanse number revealed by the previous step and place the revealed expanse numbers across the top starting at the left above the top left inner cell 18 in ascending order, or other order used when creating this portion of the address, and create an undetermined number of rows.

Prime factor the network number portion of the address.

Fill in the inside of the data table starting at the top left inner cell 18, left to right, top to bottom, with consecutive prime numbers starting at two and ending with at least the prime number equal to the largest prime number revealed when prime factoring the network number portion of the address.

Down the left side of the data table starting to the left of the top left inner cell 18, list consecutive prime numbers starting with two down the left side and continue down until at least the last row inside the data table containing prime numbers. These numbers represent possible network numbers.

Place a mark 58 in cells inside the data table containing a prime number that corresponds to a prime number revealed by prime factoring in this step.

Note the relationships revealed by the marks 58 between the expanse numbers across the top of the data table and the network numbers down the left side of the data table.

Step four. Network-Element Number

If the network-element number portion of the address can be prime factored this indicates that the number-element number is calculated. Decoding a calculated network-element number will reveal the network-elements on other devices to which the access device 12 is participating.

To Decode a Calculated Network-Element Number:

Create a data table FIG. 2 containing a column for each expanse/network number revealed in the previous step across the top above the top left inner cell 18 in ascending order or other order used when calculating this portion of the address and create an undetermined number of rows.

Prime factor the network-element portion of the address.

Fill in the inside of the data table starting at the top left inner cell 18, left to right, top to bottom, with consecutive prime numbers starting at two and ending with at least the prime number equal to the largest prime number revealed when prime factoring the network-element number portion of the address.

Down the left side of the data table starting nearest the top to the left of the top left inner cell 18, list prime numbers starting with two down the left side and continue down until at least the last row inside the data table containing prime numbers. These numbers represent possible network-element numbers.

Place a mark 58 in cells inside the data table containing a prime number that corresponds to a prime number revealed by prime factoring in this step.

Note the relationships revealed by the marks 58 between the expanse/network numbers across the top of the data table, and the network-element numbers down the left side of the data table.

Step five. Sub-Element Number FIG. 3 and FIG. 7

If the Sub-Element number portion of the address can be prime factored this indicates that the Sub-Element number is calculated. Decoding a calculated sub-element number will reveal the sub-elements of related network-elements to which the access device 12 is connected, and which ports on the access device 12 are in use.

To Decode a Calculated Sub-Element Number:

Create a data table FIG. 3 containing a column for each expanse/network/network-element number revealed in the previous step plus an additional column to represent the access device 12 ports or connection points in use, and create an undetermined number of rows in this data table.

Across the top in ascending order, or other order used when calculating this portion of the address, starting at the left above the top left inner cell location 18 list the expanse/network/network-element numbers 20 revealed in the previous step. In the last column 22, place indicia 54 to represent the access device 12 ports.

Prime factor the sub-element portion of the address.

Fill in the inside of the data table starting at the top left inner cell 18, left to right, top to bottom, with consecutive prime numbers starting at two and ending with at least the prime number equal to the largest prime number revealed when factoring the sub-element number portion of the address.

Down the left side of the data table starting nearest the top, list prime numbers 24 starting with two down the left side 56 and continue down until at least the last row inside the data table containing prime numbers. These numbers 56 represent possible sub-element numbers for the columns representing network-elements, and these numbers 56 also represent port numbers for the last 22 column representing access device 12 ports.

Place a mark 58 in cells inside the data table containing a prime number that corresponds to a prime number revealed by prime factoring in this step.

Note the relationships revealed by the marks 58 between the expanse/network/network-element numbers 20 across the top of the data table, and the sub-element numbers down the left side 56 of the data table; also note the marks 58 in the last column 22 representing ports on the access device 12.

Step six. Port Number

If the Port number portion of the address can be prime factored this indicates the port number is calculated. Decoding a calculated port number will reveal which ports on the access device 12 are connected to which ports and related sub-elements on other devices.

To Decode a Calculated Port Number:

Create a data table FIG. 4 containing a column for each port or connection point 30 on the access device 12 revealed in the previous step, and create an undetermined number of rows.

Across the top in ascending order or other order used when calculating this portion of the address starting at the left above the top left inner cell location 18 list the port numbers 30 revealed in the previous step.

Down the left side of the data table starting at the top to the left of the top left inner cell location 18 in ascending order or other order chosen when calculating this portion of the address, list all expanse/network/network-element/sub-element numbers 26 revealed in the previous step.

Prime factor the port number portion of the address.

Fill in the inside of the data table starting at the top left inner cell 18, left to right, top to bottom, with consecutive prime numbers starting at two and ending with at least the prime number equal to the largest prime number revealed when prime factoring the pat number portion of the address.

Down the left side of the data table starting immediately after the previously listed information, list prime numbers 28 starting with two and continue down until at least the last row inside the data table containing prime numbers. These numbers represent possible port numbers on core device 10 sub-elements listed directly above in the same column.

Place a mark 58 in cells inside the data table containing a prime number that corresponds to a prime number revealed by prime factoring in this step.

Note the relationships and connectivity information revealed by the marks 58. Each column should have two marks 58 in it. These marks 58 represent which access device 12 port is connected to a given core devices sub-element and port number. Reference a column representing an access device 12 port 30, move down the column until a mark 58 is reached; this marked row number represents the expanse/network/network-element/sub-element 26 to which the given access device 12 port is connected. Continue down the column to the next mark 58, this marked row represents the port number on the sub-element used to make the connection to the access device 12.

Step seven. Access Device Hardware Address

This portion of the address is never calculated.

Decoding a calculated core device 10 address in the base ten numbering system:

Step one. Autonomous System Number

The Autonomous System number is never calculated.

Step two. Expanse Number

The Expanse number may or may not be calculated; if the expanse number portion of the address can be prime factored this indicates that the number is calculated. Decoding a calculated expanse number will reveal the expanses to which the core device 10 is participating.

To Decode a Calculated Expanse Number:

Prime factor the expanse number portion of the address. The resulting numbers represent the expanses to which the core device 10 is connected.

Step three. Network Number

The network number may or may not be calculated; if the network number portion of the address can be prime factored this indicates that the number is calculated. Decoding a calculated network number will reveal the networks to which the core device 10 is participating, and the expanses in which the revealed networks reside.

To Decode a Calculated Network Number:

Create a data table FIG. 2 containing a column for each expanse number revealed by the previous step and place the revealed expanse numbers across the top starting at the left in ascending order, or other order used when creating this portion of the address, and create an undetermined number of rows.

Prime factor the network number portion of the address.

Fill in the inside of the data table starting at the top left inner cell 18, left to right, top to bottom, with consecutive prime numbers starting at two and ending with at least the prime number equal to the largest prime number revealed when factoring the network number portion of the address.

Down the left side of the data table starting nearest the top, list prime numbers starting with two down the left side and continue down until at least the last row inside the data table containing prime numbers. These numbers represent possible network numbers.

Place a mark in cells inside the data table containing a prime number that corresponds to a prime number revealed by factoring in this step.

Note the relationships revealed by the marks between the expanse numbers across the top of the data table and the network numbers down the left side of the data table.

Step four. Network-Element Number

The network-element number will always be calculated. Decoding the network-element number will reveal which network-elements of other core devices are connected to the present core device 10 and to which networks they belong. Also, the non-calculated core device 10 information for the present core device 10 will be revealed including the largest port number being utilized on said present core device 10.

To Decode the Network-Element Number:

Create a data table FIG. 5 containing a column for each expanse/network number 32 revealed by the previous step plus four additional columns 34 36 38 40 and create an undetermined number of rows. The additional columns 34 36 38 contain the non-calculated address information of the present core device 10 and a port number 40 to be used to decode the sub-element number.

Place the expanse/network numbers revealed from the previous step across the top 23 starting at the left above the top left infer cell location 18 in ascending order, or other order used when creating this portion of the address. In the last four columns 34 36 38 40 place indicia to represent a network-element number 34, network number 36, expanse number 38 and port number 40, these indicia should be placed in the order used when creating this portion of the address.

Prime factor the network-element number portion of the address.

Fill in the inside of the data table starting at the top left inner cell 18, left to right, top to bottom, with consecutive prime numbers starting at two and ending with at least the prime number equal to the largest prime number revealed when factoring the network-element number portion of the address.

Down the left side 42 of the data table starting nearest the top to the left of the top left inner cell location 18, list prime numbers 42 starting with two down the left side and continue down until at least the last row inside the data table containing prime numbers. These numbers represent possible network-element numbers.

Place a mark 58 in cells inside the data table containing a prime number that corresponds to a prime number revealed by prime factoring in this step.

Note the relationships revealed by the marks between the expanse/network numbers 32 across the top of the data table and the possible network-element numbers down the left side of the data table 42. Also, note in the three columns 34 36 38 following the network/expanse number columns, should now reveal via marks 58 the non-calculated network-element number 34, network number 36, and expanse number 38 of the present core device 10 itself. The last column 40 represents the largest port number used on the core device 10 itself, this is utilized in the following step.

Step five. Sub-Element Number

The sub-element number will always be calculated. Decoding the sub-element number will reveal which sub-elements on network-elements, including the present network-element that are in use, and which ports on the present network-element are in use.

To Decode the Sub-Element Number:

Create a data table FIG. 6 containing a column for each expanse/network/network-element number 44 revealed by the previous step plus an additional column for the present device itself 46, plus a number of additional columns 48 equal to the number of prime numbers starting at two and ending with the port number revealed in the last column 40 of the previous step; also, create an undetermined number of rows.

Place the expanse/network/network-element numbers 44 revealed from the previous step across the top starting at the left above the top left inner cell location 18 in ascending order, or other order used when creating this portion of the address. In the next column 46, place indicia to represent the present core device 10 itself Number the remaining columns with prime numbers 48 starting at two and end with the prime number of the port revealed in the last column 40 of the previous step.

Prime factor the sub-element number portion of the address.

Fill in the inside of the data table starting at the top left inner cell 18, left to right, top to bottom, with consecutive prime numbers starting at two and ending with at least the prime number equal to the largest prime number revealed when factoring the sub-element number portion of the address.

Down the left side of the data table starting nearest the top to the left of the top left inner cell location 18, list prime numbers 50 starting with two down the left side and continue down until at least the last row inside the data table containing prime numbers. These numbers represent possible sub-element numbers.

Place a mark 58 in cells inside the data table containing a prime number that corresponds to a prime number revealed by prime factoring in this step.

Note the relationships revealed by the marks 58 between the expanse/network/network-element numbers 44 across the top of the data table and the possible sub-element numbers 50 down the left side of the data table. Also note which sub-elements the core device 10 itself has in use by the first additional column 46 representing the present core device 10 itself. To determine which ports on the present core device 10 itself are in use, reference the column representing the core device itself 46, drop down that column until a marked 58 number representing a sub-element is reached noting that sub-element number, and then move to the right and note each mark 58 along the way. These marks represent port numbers listed in the related columns across the top 48 in use on the present sub-element; repeat this for each sub-element indicated in the column 46 representing the present core device 10 itself.

Step six. Port Number

The port number will always be calculated. Decoding the port number will reveal which ports on the present core device 10 itself are connected to which ports on other devices and to which sub-elements these ports belong.

To Decode the Port Number:

Create a data table similar to the data table used in decoding an access device port number FIG. 4 containing a column for each sub-element/port on the present core device 10 itself revealed in the previous step (instead of port or connection point numbers 30 used in access devices). Create a row for each expanse/network/network-element/sub-element 26 revealed in the previous step and continue with an undetermined number of additional rows.

Across the top in ascending order or other order used when calculating this portion of the address starting at the left above the top left inner cell 18 list the sub-element/port numbers revealed in the previous step.

Down the left side of the data table starting at the top to the left of the top left inner cell location 18 in ascending order or other order chosen when calculating this portion of the address, list all expanse/network/network-element/sub-element numbers 26 revealed in the previous step.

Prime factor the port number portion of the address.

Fill in the inside of the data table starting at the top left inner cell 18, left to right, top to bottom, with consecutive prime numbers starting at two and ending with at least the prime number equal to the largest prime number revealed when factoring the port number portion of the address.

Down the left side of the data table starting immediately after the previously listed information, list prime numbers 28 starting with two and continue down until at least the last row inside the data table containing prime numbers. These numbers represent possible port numbers on network elements listed directly above 26 in the same column.

Place a mark 58 in cells inside the data table containing a prime number that corresponds to a prime number revealed by factoring in this step.

Note the relationships and connectivity information revealed by the marks 58. Each column represents a port on the present core device 10 itself and should have either two marks in it, or no marks at all in it. If a column has no marks in it, this means an access device 12 is connected to the port the column represents. Choose a column representing a port and follow that column down to the first mark 58, this mark represents the core device 10 sub-element 26 of another network element that the selected port is attached to. To determine what port number on that sub-element is used for this connection, continue down the column until the second mark is reached. This mark indicates, by the port number listed on the left side of the data table 28, which port on that sub-element 26 is used for this connection; continue this for each column in this data table.

Step seven. Access Device Hardware Address

This portion of the address is not used for core devices

This section may be summarized as:

Decoding the completed device address and thereby revealing all encoded information by decoding each completed device address portion individually and sequentially beginning with the first or left-most device address portion of the predetermined order utilizing one of the following as required:

Notate the assigned number representing the device address portions of the completed device address, or;

Prime factoring the device address portion, or;

Decode the Device Address Portions by:

Create a data table or other usable construct corresponding to the data table, or other usable construct utilized when creating the current device address portion.

List the currently known reference information, and additional reference information in locations in the data table or other usable construct corresponding to locations utilized when originally creating the current device address portions of the completed device address.

Prime factor the device address portion.

Placing prime numbers in an appropriate order and locations in the data table, or other usable construct corresponding to the order and locations utilized when originally creating the current device address portion.

Notate the numbers or locations in the data table or other usable construct corresponding to numbers resulting from the step of prime factoring the device address portion.

Notate the relationships revealed by the usable indicia between the known reference information and the additional reference information.

Other Mathematical Base Systems:

The process of calculating device addresses may be done in any numerical base system. The normal or natural base system for calculating addresses by hand is base ten or decimal. This may be done in any base system, computers and like devices typically prefer base two, or binary. The lengths of some addresses created by this method may be very long and it may be desirable to compress or shorten the resulting address. Converting the resulting address to the base eighty-five, or quinoctogesimal, numbering system will accomplish this.

The base eighty-five mathematical numbering system requires a set of symbols to represent the eighty-five 'numbers' in that base system. Our decimal numbering system (base ten) only provides for ten such symbols. Since there are seventy-five more symbols needed to utilize the base eighty-five numbering system they must be created or selected from other known symbols. The symbols used to create the base eighty-five numbers for this addressing method are as follows:

0123456789ABCDEFGHIJKLMNOPQRSTUVWXYZabcdefghijklmnopqrstuvwxyz!#$ %&( )*+−;<=>?@^_{|}~

The ':' symbol is intentionally left out so it would not be confused with other symbols in this numbering system.

For example the calculated decimal address ::1:2:2:3:651:390:1234567:: would appear as ::1:2:2:3:7u:4o:20<R:: in the said base eighty-five numbering system. Longer calculated addresses are more effective compressed by base 85 numbering.

This section may be summarized as:

Reducing or compressing said a device address portion to fewer digits or characters by conversion to the base eighty-five mathematical numbering system, or other usable base mathematical numbering system.

Conclusion, Ramifications, and Scope:

This concludes the detailed description of this method of addressing networked devices.

Thus the reader will see that the method described herein provides a new manner in which to utilize addressing methods for which this method applies to produce a superior communication infrastructure. Furthermore, a number of advantages of this method of addressing networked devices are:

in allowing devices to support a number of ports and connections while maintaining only one hardware device address.

creating a method of addressing devices that requires less intelligence in access devices by allowing the bulk of the addressing algorithm to reside on core devices, therefore lowering the complexity, and cost of the access devices.

in creating an addressing method that also provides network and fault management by allowing the network infrastructure itself to monitor and report on the overall topology, connectivity, and associated hardware, with no additional protocols, software, infrastructure, or personnel.

that it provides the ability to begin mapping or tracing every connection or link in an unknown communication infrastructure, utilizing said method, from a single device address.

While my above description contains many specificities, these should not be construed as limitations on the scope of the method, but rather as an exemplification of one embodiment thereof. Other variations are possible. For example, this method could be utilized in equipment not mentioned herein such as manufacturing devices and industrial robots.

Accordingly, the scope of the method should be determined not by the embodiment(s) described or illustrated, but by the appended claims and their legal equivalents.

I claim:

1. A method of addressing networked devices comprising the steps of: providing a communications infrastructure or network comprising one or more core devices and one or more access devices interconnected to said core devices for the purpose of communication and or data exchange;
   assigning said communications infrastructure or network a predetermined number;
   assigning each determined sub-portion of said communications infrastructure or network, and each device and or device sub-part at least one predetermined prime number;
   creating one of a plurality of address portions by one of the following as required:
   1) notating said predetermined number identifying said communications infrastructure or network, or said predetermined prime number identifying said determined sub-portion of said communications infrastructure or network, or said device and or device sub-part;
   2) producing the product of at least two said predetermined prime numbers representing the same said determined sub-portion of said communications infrastructure or network, or;
   3) creating an address portion by:
      a) creating a data table or other usable construct comprising outer locations suitable for listing one or more sets of said predetermined prime numbers and or additional preordered prime numbers, and inner locations usable to identify relationships between outer locations,
      b) listing said one or more sets of said predetermined prime numbers and additional said preordered prime numbers in relatable outer locations of said data table or other usable construct,
      c) placing usable indicia in appropriate inner locations of said data table or other usable construct that identify needed relationships between said one or more sets of said predetermined prime numbers and the additional said preordered prime numbers,
      d) placing a continuous string of preordered prime numbers in inner locations of said data table or other usable construct including previously notated inner locations until last inner notated location has been numbered,
      e) calculating the product of the prime numbers located in notated inner locations of said data table or other usable construct,
      f) using said product as required as a said one of a plurality of address portions;
   repeating step of said creating one of a plurality of address portions as required for each required portion of a complete address;
   assembling said complete address by arranging said plurality of address portions in a predetermined order utilizing suitable indicia to indicate the beginning and ending of said complete address, and further using suitable indicia to indicate individual said address portions within said complete address;
   decoding said complete address thereby revealing all encoded information by decoding each said address portion individually in the same said predetermined order as originally arranged by one of the following decoding methods as required:
   1) notating said predetermined number representing said communications infrastructure or network;
   2) prime factorization;
   3) decoding by:
      a) creating a data table or other usable construct similar to the previous data table or other usable construct utilized when creating said address portion,
      b) listing information revealed by previous executions of this decoding method and or other said following decoding methods in outer locations of said data table or other usable construct that correspond to outer locations utilized when creating said address portion,
      c) prime factorization of said address portion,
      d) placing said continuous string of preordered prime numbers in inner locations of said data table or other usable construct in a manner similar to manner utilized when originally creating said address portion, continue until inner locations are numbered with a prime number equal to that of the largest prime number revealed in the previous step of said prime factorization of said address portion,
      e) notating numbers in inner locations of said data table or other usable construct corresponding to prime numbers resulting from the step of said prime factorization of said address portion using said usable indicia as notation,
      f) placing said preordered prime numbers in relatable outer locations of said data table or other usable construct in the same manner utilized when creating said data table or other usable construct, numbering until the last row or column of inner numbers has been numbered,
      g) notating the relationships revealed by said usable indicia in inner locations of said data table or other usable construct and information listed in outer locations of said data table or other usable construct;
   whereby said method will provide a means of addressing said communications infrastructure or network that allows networked devices to support a plurality of sub-parts and or parts while maintaining only one address;
   whereby said method will provide a means of addressing networked devices that provides the ability to map or trace every connection or link in an unknown communications infrastructure or network, utilizing said method, starting from a single address.

2. A method of addressing networked devices as claimed in claim 1 further comprising a second static or fixed address for said core devices thereby allowing one skilled in the art to provide a fixed and non-changing point for reference for any required use.

3. A method of addressing networked devices as claimed in claim 1 wherein the step of said creating one of a plurality of address portions by may be achieved by use of a mathematical formula to achieve the same results.

4. A method of addressing networked devices as claimed in claim 1 wherein said data table or other usable construct is created by overlaying a series of horizontal and vertical lines in a grid-like pattern of required size.

5. A method of addressing networked devices as claimed in claim 1 wherein the step of said placing a continuous string of preordered prime numbers in inner locations of said data table or other usable construct may be executed by numbering inner table locations starting at the top left inner location with consecutive prime numbers starting with two and ending with the largest needed prime number.

6. A machine for addressing networked devices comprising:
   a means of communication by a plurality of devices interconnected for purposes of communication;
   a memory capable of storing a data table or other usable construct and device specific information;
   a memory controller capable of the following:
   1) assigning said means of communication a predetermined number;
   2) assigning each determined sub portion of said means of communication, and each device and or device sub-part at least one predetermined prime number;
   3) creating one of a plurality of address portions by one of the following as required:
      a) notating said predetermined number identifying said means of communication, or said predetermined prime number identifying said determined sub-portion of said means of communication, or said device and or device sub-part;
      b) producing the product of at least two said predetermined prime numbers representing the same said determined sub-portion of said means of communication, or;
      c) creating an address portion by:
         I) creating said data table or other usable construct comprising outer locations suitable for listing one or more sets of said predetermined prime numbers and or additional preordered prime numbers, and inner locations usable to identify relationships between outer locations,
         II) listing said one or more sets of said predetermined prime numbers and additional said preordered prime numbers in relatable outer locations of said data table or other usable construct,
         III) placing usable indicia in appropriate inner locations of said data table or other usable construct that identify needed relationships between said one or more sets of said predetermined prime numbers and the additional said preordered prime numbers,
         IV) placing a continuous string of preordered prime numbers in inner locations of said data table or other usable construct including previously notated inner locations until last inner notated location has been numbered,
         V) calculating the product of the prime numbers located in notated inner locations of said data table or other usable construct,
         VI) using said product as required as a said one of a plurality of address portions;
   4) repeating step of said creating one of a plurality of address portions as required for each required portion of a complete address;
   5) assembling said complete address by arranging said plurality of address portions in a predetermined order utilizing suitable indicia to indicate the beginning and ending of said complete address, and further using suitable indicia to indicate individual said address portions within said complete address;
   6) decoding said complete address thereby revealing all encoded information by decoding each said address portion individually in the same said predetermined order as originally arranged by one of the following decoding methods as required:
      a) notating said predetermined number representing said means of communication;
      b) prime factorization;
      c) decoding by:
         I) creating a data table or other usable construct similar to the previous data table or other usable construct utilized when creating said address portion,
         II) listing information revealed by previous executions of this decoding method and or other said following decoding methods in outer locations of said data table or other usable construct that correspond to outer locations utilized when creating said address portion,
         III) prime factorization of said address portion,
         IV) placing said continuous string of preordered prime numbers in inner locations of said data table or other usable construct in a manner similar to manner utilized when originally creating said address portion, continue until inner locations are numbered with a prime number equal to that of the largest prime number revealed in the previous step of said prime factorization of said address portion,
         V) notating numbers in inner locations of said data table or other usable construct corresponding to prime numbers resulting from the step of said prime factorization of said address portion using said usable indicia as notation,
         VI) placing said preordered prime numbers in relatable outer locations of said data table or other usable construct in the same manner utilized when creating said data table or other usable construct, numbering until the last row or column of inner numbers has been numbered,
         VII) notating the relationships revealed by said usable indicia in inner locations of said data table or other usable construct and information listed in outer locations of said data table or other usable construct;
whereby said machine will provide a means of addressing said means of communication that allows networked devices to support a plurality of sub-parts and or ports while maintaining only one device address;

whereby said machine will provide a means of addressing networked devices that provides the ability to map or trace every connection or link in an unknown communication network, utilizing said method, starting from a single device address.

7. A machine for addressing networked devices as claimed in claim 6 further comprising a second static or fixed address for said core devices thereby allowing one skilled in the art to provide a fixed and non-changing point for reference for any required use.

8. A machine for addressing networked devices as claimed in claim 6 wherein the step of said creating one of a plurality of address portions by may be achieved by use of a mathematical formula to achieve the same results.

9. A machine for addressing networked devices as claimed in claim 6 wherein said data table or other usable construct is created by overlaying a series of horizontal and vertical lines in a grid-like pattern of required size.

10. A machine for addressing networked devices as claimed in claim 6 wherein said memory controller may execute said step of said placing a continuous string of preordered prime numbers in inner locations of said data table or other usable construct may be executed by numbering inner table locations starting at the top left inner location with consecutive prime numbers starting with two and ending with the largest needed prime number.

* * * * *